United States Patent [19]
Asano et al.

[11] 3,757,192
[45] Sept. 4, 1973

[54] PLURAL STEPPING MOTOR NUMERICAL FEED CONTROL DEVICE

[75] Inventors: Hiroaki Asano, Hekikai-gun, Aichi-ken; Tsuyoshi Koide; Taisuke Kawamata, both of Kariya-shi, Aichi-ken, all of Japan

[73] Assignee: Toyoda Koki Kabushiki Kaisha, Aichi-ken, Japan

[22] Filed: Jan. 4, 1971

[21] Appl. No.: 103,683

[52] U.S. Cl. .................. 318/696, 318/8, 318/603
[51] Int. Cl. ............................................ G05b 19/40
[58] Field of Search ................... 318/8, 603, 685, 318/696

[56] References Cited
UNITED STATES PATENTS

| | | | |
|---|---|---|---|
| 2,537,427 | 1/1951 | Seid et al. | 318/603 |
| 2,523,503 | 9/1950 | Fairbanks | 318/8 |
| 3,446,099 | 5/1969 | Leshey et al. | 318/8 X |
| 3,497,778 | 2/1970 | Gerber | 318/8 |
| 3,531,700 | 9/1970 | Gill et al. | 318/8 |

*Primary Examiner*—T. E. Lynch
*Attorney*—Oblon, Fisher & Spivak

[57] ABSTRACT

A numerical feed control device is disclosed in which a worktable is driven by a pair of pulse motors, each of which moves a different distance when actuated by a driving pulse. The two motors are mechanically coupled so that their respective movements are added together. A control system is provided for permitting the pulse motors to be selectively driven so that the resolution of the system can be adjusted, where resolution is defined as the movement of the work table for each driving pulse applied to the system. The control system includes decoding equipment for properly selecting resolution commands from input numerical instruction words, and a network of logic gates for appropriately driving the two pulse motors in response to a particular resolution command.

6 Claims, 4 Drawing Figures

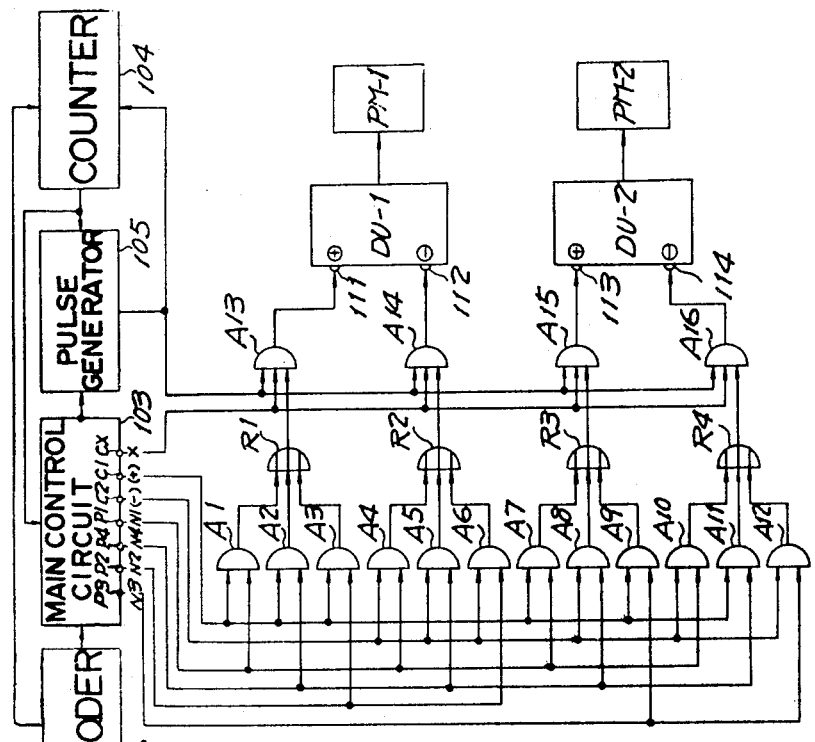
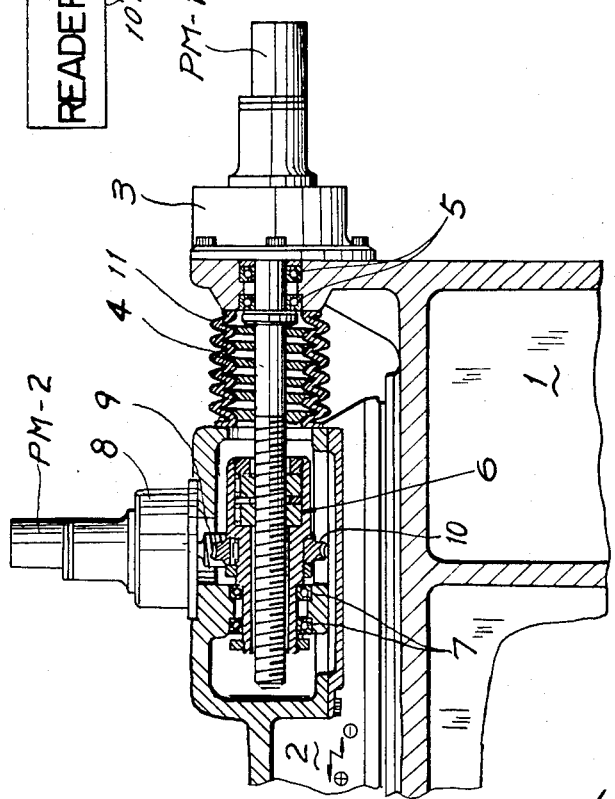
Fig. 2
Fig. 1

PLURAL STEPPING MOTOR NUMERICAL FEED CONTROL DEVICE

BACKGROUND OF THE INVENTION

1. Field Of The Invention

The present invention relates to a numerical feed control device in which the resolution, namely, the distance of movement of a movable member per one pulse, is easily changeable.

2. Description Of The Prior Art

Heretofore, in conventional feed devices for moving a movable member, such as a slide table, a cross slide, or the like, the same was moved by two pulse motors each of which rotated in the same direction and had to be independently utilized. Thus, in the past, one of the pulse motors could be independently utilized to provide a rapid feed of the movable member and the other pulse motor could be independently utilized to provide a slow or finishing feed. While somewhat satisfactory, with the above described numerical feed control device, only one resolution could be realized for the rapid and slow feed movements and as a result thereof, many inconveniences in operation would occur. Moreover, in the past, since the pulse motor for providing a rapid feed required a large resolution, the same had to be large in size because of the requirement of large output torque and large allowable load inertia, and was further found to have poor sensitivity at high frequencies.

SUMMARY OF THE INVENTION

Accordingly, it is an object of the present invention to provide a new and improved unique numerical feed control device in which a movable member is moved by a pair of pulse motors which are relatively small in size.

Another object of the present invention is to provide a new and improved numerical feed control device for controlling the rotational direction or stopping of a pair of pulse motors, wherein the resolution is easily changed by means of simultaneously changing the rotational directions and stopping of the pair of pulse motors.

Briefly, in accordance with this invention, the foregoing and other objects are, in one aspect, attained by the provision of a numerical feed control device having a pair of pulse motors for moving a movable member in a given direction and wherein control circuitry is provided for enabling the resolution of the device to be easily changed by simultaneously enabling the direction of rotation and stopping of the motors to be obtained.

BRIEF DESCRIPTION OF THE DRAWINGS

The foregoing and other objects of the present invention will become more fully apparent from the following description of preferred embodiments of the present invention, with reference to the accompanying drawings, in which:

FIG. 1 is a partial sectional view of a table feed device in accordance with the present invention;

FIG. 2 is a block diagram of a preferred embodiment of a numerical control system in accordance with the present invention;

DETAILED DESCRIPTION OF THE INVENTION

Figure 3:
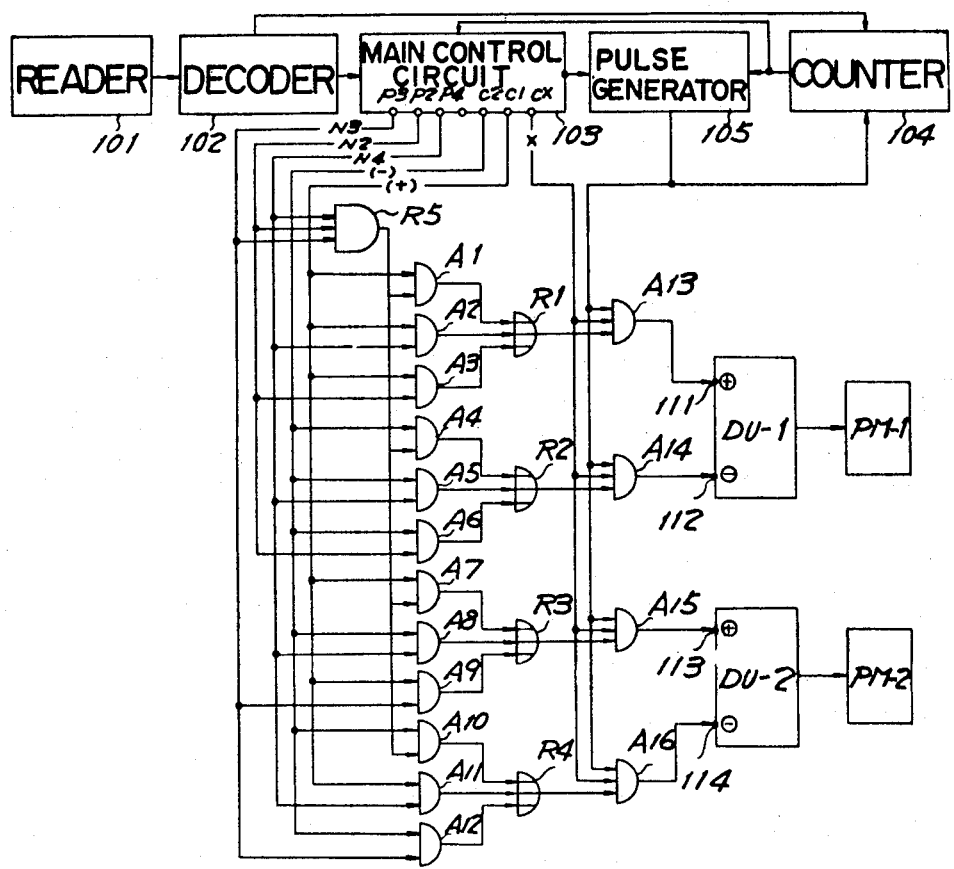
FIG. 3 is a block diagram of an alternative and preferred embodiment of the control system in accordance with the present invention; and, FIG. 4 is a block diagram of a typical main control circuit for use in the embodiment of FIG. 2.

Referring now to the Drawings, wherein like reference numerals designate identical, or corresponding parts throughout the several views, and more particularly to FIG. 1 thereof, wherein a table feed device is shown for enabling a movable member to move the table thereof in a particular direction, such, for example, as that defined as the "X" axis. The table feed device comprises a machine bed 1 having a table 2 slidably mounted thereon. It should be understood that on the table 2, workpieces, machine tools, or the like may be readily mounted. A reversible pulse motor PM–1 is mounted on the right end of the bed 1 through a conventional reduction gear device 3. A feed screw shaft 4 which is connected to the reduction gear device 3 is rotatably journalled on the bed 1 through anti-friction ball bearings 5. The shaft 4 is operatively engaged with a feed nut assembly 6 which is rotatably mounted within the table 2 through anti-friction ball bearings 7. Another reversible pulse motor PM–2 is mounted on the table 2 through a conventional reduction gear device 8 and the output shaft thereof carries a worm 9. The worm 9 is engaged with a worm wheel 10 which is concentrically keyed to the feed nut assembly 6. With the above arrangement, the table 2 can be moved in the leftward and rightward directions on the bed 1 by rotation of either or both of the pulse motors PM–1 and PM–2. An extensible bellows 11 is secured between the bed 1 and the table 2 to prevent dirt and other foreign matters from interfering with the feed movement of the shaft 4 or other members. In the embodiment shown, a clockwise rotation of each of the pulse motors will cause the table 2 to move in a leftward or forward direction as shown in FIG. 1 by a symbol "+". Similarly, a counterclockwise rotation of each of the pulse motors will cause the table 2 to move in an opposite or rightward direction as shown in FIG. 1 by a symbol "–".

The resolution, which is defined as the distance of movement of the table 2 for each pulse applied to the pulse motors PM–1 and PM–2, will be referred to hereinafter by the respective reference letters A and B. Moreover, in the present embodiment, it may be assumed by way of example that the resolution A is larger than the resolution B. Thus, for example, the resolution A may be set to a numeral value of 0.06 mm/pulse, and the resolution B may be set to a numeral value 0.04 mm/pulse.

Referring now to FIG. 2, a first embodiment of a control system, according to the present invention, for controlling the feed speed rate of the table 2 will be described. In FIG. 2, a conventional reader 101 is provided for sensing stored command information, such as may be placed upon punched tape or the like (not shown) and the same is connected to a conventional decoder 102 for decoding the command information. The decoder 102 is connected to a counter 104 and a main control circuit 103 which is provided for controlling the rotation of the pulse motors. The main control circuit 103 is shown in detail in FIG. 4.

Referring again to FIG. 2, the output terminals of the main control circuit 103 which are designated P1 through P4 are for selecting a particular command of resolution N1 through N4 (explained in detail hereinafter) and the same are respectively connected to the AND gates A1,A4, A7, and A10,A3 and A6,A9 and A12, and A2,A5,A8, and A11.

The output terminals of the main control circuit 103 which are designated C1 and C2 are for determining the direction of rotation of the respective pulse motors PM-1 and PM-2, and the same are respectively connected to the AND gates A1,A2,A3,A7,A9, and A11 and A4,A5,A6,A8,A10, and A12. The output terminal of the main control circuit 103 which is designated CX is for determining direction of movement of the table 2 along the X-axis and the same is connected to the AND gates A13 through A16. The AND gates A1,A2, and A3 are connected to a terminal 111 of a driving circuit DU-1 for defining the clockwise rotation of the pulse motor PM-1 through the OR GATE R1 and the AND gate A13. The AND gates A4,A5, and A6 are connected to a terminal 112 of the driving circuit DU-1 for defining the counterclockwise rotation of the pulse motor PM-1 through the OR gate R2 and the AND gate A14. In a similar manner, the AND gates A7,A8, and A9 and A10,A11 and A12 are respectively connected to terminals 113 and 114 of a driving circuit DU-2 for defining the clockwise and counterclockwise rotation of the pulse motor PM-2 through respective OR gates R3 and R4 and respective AND gates A15 and A16. It should be understood that the pulse motors (PM-1, PM-2) and the drivers (DU-1, DU-2) are conventional units and may be, for example, of the type manufactured by Fujitsu, Ltd. of Kawasaki, Japan, and sold, respectively, as Type EHPM 1-SSS and FANUC 613. The pulse generator 105 is connected to the AND gates A13 through A16 and to the counter 104. It should be further understood that the counter 104 is connected to the pulse generator 105 for providing a stopping signal and to the main control circuit 103 for providing a resetting signal.

The above-mentioned term "selecting a particular command of resolution" means selecting a command for either or both of the pulse motors PM-1 and PM-2, the command telling which motor is to be driven and the direction of rotation thereof. In accordance with the command selection, the table 2 will move a given distance for each pulse applied to either or both of the pulse motors PM-1 and PM-2.

Figure 4:
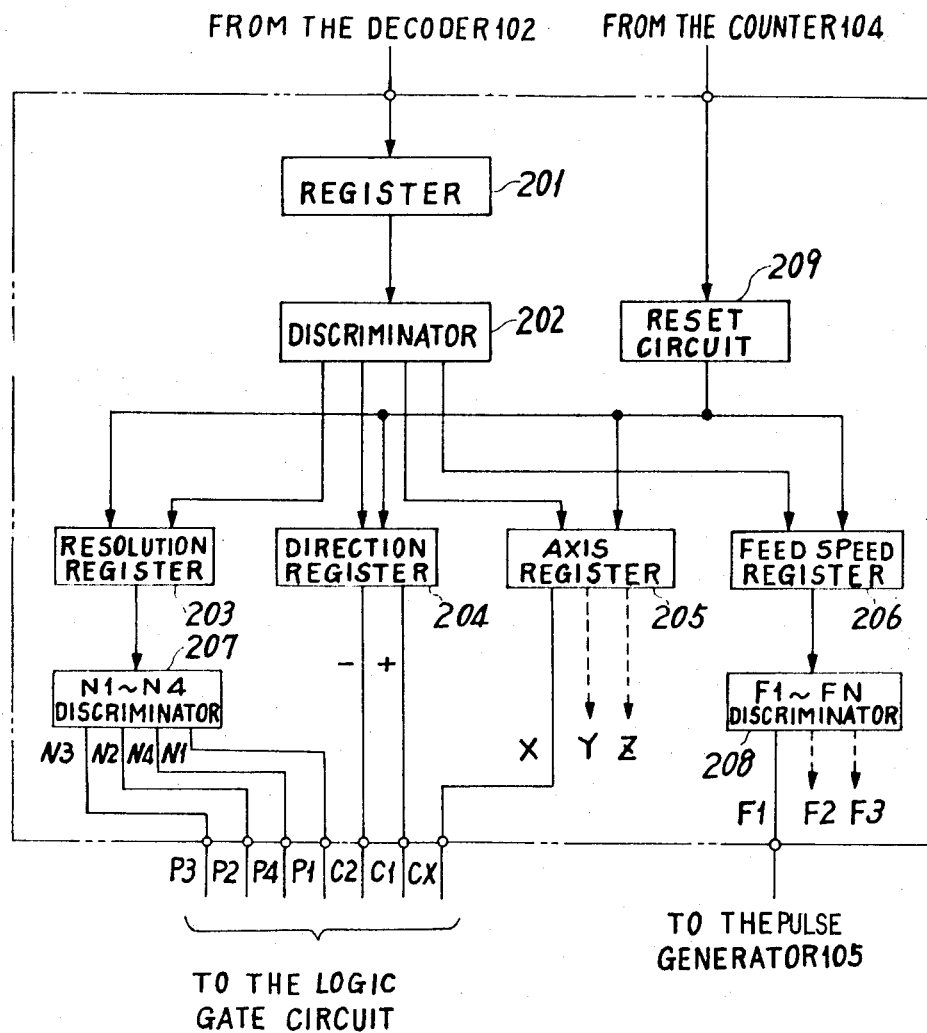

Referring now to FIG. 4, the main control circuit 103 is shown as including a register 201 connected to the decoder 102; a discriminator 202 connected to a register 201; a resolution register 203, a direction register 204, an axis register 205, and a feed speed register 206 which are connected to the discriminator 202; and N1-N4 discriminator 207 and an F1-FN discriminator 208 which are respectively connected to the registers 203 and 206; and a reset circuit 209 connected to the registers 203, 204, 205, and 206. The discriminator 207 is connected to output terminals P1, P2, P3 and P4, and the registers 204 and 205 are, respectively, connected to the output terminals (C1 and C2) and Cx. These terminals are in turn connected to a logic gate circuit which includes AND gates A1 through A16 and OR gates R1 through R4, as shown in FIG. 2. The discriminator 208 is connected to a pulse generator 105. The above mentioned references F1-FN designate the feed speed rate of the table 2 of FIG. 1.

It should be understood that while the reader 101 and the decoder 102 of FIG. 2 and the registers 201, 203, 204, 205 and 206, and the discriminators 201, 207 and 208 of FIG. 4 have been shown in block form, that these components are conventional and well known to those of ordinary skill in the art.

Having now fully described the manner in which the various components of the control device of the present invention are interconnected, the manner in which the present invention operates will now be described in detail. Initially, an information command in the format F1X+5000N1CR, which is stored on the punched tape or the like (not shown) is read by the reader 101, and then sent to the decoder 102 for decoding the punched information therefrom. The above mentioned exemplary information format "F1X+5000N1CR" indicates the following:

F1 designates the feed speed rate of the table 2, or, in other words, the rate of pulses emitted from the pulse generator 105;

X designates movement along the X-axis which is one of the operating axes of the machine tool;

+ designates that a forward movement of the table 2 is desired;

5000 designates the number of pulses to be applied to the pulse motor (s) and hence the desired moving distance of the table 2;

N1 designates the selection of a particular resolution command; and,

CR designates the end of a block of information.

In the above described decoded information, it should be understood that the numeral information "5000" is sent to the counter 104 and stored therein. The other information is sent to the main control circuit 103 for providing "1" logic level signals at the respective output terminals thereof. In other words, the decoded information, with the exception of the numeral information "5000," is sent to the discriminator 202 of FIG. 4 through the register 201 for permitting separation and appropriate channeling of the different portions of the input command. Accordingly, the feed rate information "F1" is sent to the F1-FN discriminator 208 for decoding the suffix numeral value 1, and then sent to the pulse generator 105. The axis and direction of movement commands "X" and "+" are sent to the terminals C1 and Cx. The resolution command "N1" is sent to the N1-N4 discriminator 207 for decoding the suffix numeral value 1, and then sent to the terminal P1. Upon receipt of the information "N1" and "+", the "1" logic level signals will be respectively applied from the terminals P1 and C1 to the inputs of the AND gates A1,A4,A7, and A10, and A1,A2,A3,A7, A9, and A11. Thus, the AND gates A1 and A7, each of which have signals applied to both of the input terminals thereof, will provide "1" logic level signals to the inputs of the AND gates A13 and A15 through respective OR gates R1 and R3. On the other hand, upon receipt of the information "X", the "1" logic level signal will be applied from the terminal CX to the inputs of the AND gates A13,A14,A15, and A16. Now, when the pulse generator 105 receives the infromation "CR", pulses will be emitted therefrom and will be applied to the counter 104 and to the inputs of the AND gates A13,A14,A15, and A16. As a result thereof, the AND gates A13 and A15 will be opened and thereby allow pulses from the pulse generator 105 to be applied to the terminals 111 and 113 for rotating the pulse motors PM-1 and PM-2 in a clockwise direction. The clockwise rotation of the motors PM-1 and PM-2 will in turn cause the table 2 to move in a forward direction in accordance with the combined rotation of the pair of pulse motors. It should be understood that the counter 104 will also receive pulses from the pulse generator 105 at the same time as the terminals 111 and 113 and that these pulses will be subtracted from the stored numeral information "5000" during the forwared rotation of the pulse motors PM-1 and PM-2. When the number in the counter 104 reaches a zero value, thereby indicating the receipt of 5000 pulses, a first signal will be emitted from the counter and applied to the pulse generator 105 for stopping the same and a second signal will be emitted from the counter and applied to the main control circuit 103 for resetting the same. Thus, it should be apparent that when the counter 104 reaches a zero value, the table 2 will stop after having been moved forward a predetermined distance at a desired feed speed.

In the exemplary preferred embodiment described above, the resolution command may be used to select four different resolutions designated by the letters N1 through N4 in accordance with the operation of the two pulse motors PM-1 and PM-2 for a forward movement of the table 2. The various resolutions N1 through N4 are defined as follows:

N1 designates the combined resolution (A+B), namely, when both pulse motors are rotated in a clockwise direction.

N2 designates the resolution A, namely, when the pulse motor PM-1 is rotated in a clockwise direction and the pulse motor PM-2 is stopped.

N3 designates the resolution B, namely, when the pulse motor PM-2 is rotated in a clockwise direction and the pulse motor PM-2 is stopped.

N4 designates the resolution (A-B), namely, when the pulse motor PM-1 is rotated in a clockwise direction and the pulse motor PM-2 is rotated in a counterclockwise direction.

The four different selection commands for various resolutions as the two pulse motors are rotated clockwise and counterclockwise are clearly shown in the following table.

trol circuit 103 similar to that of FIG. 4. The NOR gate R5 has an output terminal which is connected to the AND gates A1,A4,A7, and A10. The function of the NOR gate R5 is such that a signal will be derived therefrom and applied to the AND gates A1,A4,A7, and A10 only when the NOR gate R5 does not receive any signals from the terminals P2,P3, and P4 of the main control circuit 103. Thus, it can be readily seen that the function of the NOR gate R5 is the same as that of the connecting relationship between the terminal P1 and the AND gates A1,A4,A7, and A10 as shown in FIG. 2. The unique advantage of the present embodiment is that it is not necessary to give an information command N1, namely, the selection of a command of resolution N1 on the punched tape or the like. As such, with only three kinds of selection commands of resolution, four different table movements may be realized in a given moving direction.

It should now be apparent that the present invention relates to an improved numerical feed control device moving a movable member in either a forward or backward direction at a desired feed speed rate wherein a desired resolution, according to working conditions or finishing accuracy, is easily selected from various resolutions by means of a simple information command.

Obviously, many modifications and variations of the present invention are possible in light of the above teachings. Thus, for example, although the control system according to the present invention has been described as a single axis (X axis) control system, it is to be understood that any number of axes, such as X,Y,Z, may be controlled depending upon the command information used. Moreover, while in the present embodiments two pulse motors have been used, it is to be understood that any desired number of pulse motors may be utilized to move a movable member such as a slide table, a cross slide, or the like of a machine tool.

While the invention has been described by means of a specific embodiment, it should be understood that the

TABLE

| Table moving directions | Operating axis—X | | | | | | | |
|---|---|---|---|---|---|---|---|---|
| | Forward (+) | | | | Backward (−) | | | |
| Selection of a command of resolution | N1 | N2 | N3 | N4 | N1 | N2 | N3 | N4 |
| Rotational direction of the pulse motor: | | | | | | | | |
| PM-1 | CW | CW | ST | CW | CCW | CCW | ST | CCW |
| PM-2 | CW | ST | CW | CCW | CCW | ST | CCW | CW |
| Resolution | A+B | A | B | A−B | −(A+B) | −A | −B | −(A−B) |

NOTE.— CW = designates a clockwise rotation of the pulse motors; CCW = designates a counterclockwise rotation of the pulse motors; and, ST = designates the stopping of a pulse motor.

From the above, it can be seen by way of example that if the resolutions A and B are given the respective numerical values 0.06 mm/pulse and 0.04 mm/pulse, then the selection of a command of resolution N1, N2, N3, or N4 will provide the respective numerical values 0.1 mm/pulse, 0.06 mm/pulse, 0.64 mm/pulse, and 0.02 mm/pulse for a given direction of movement of the table 2.

Referring now to FIG. 2, a second preferred and alternative embodiment of a control system for a table feed device in accordance with the present invention is shown with the overall structure being basically similar to that of the embodiment of FIG. 2. In FIG. 3, the reference letter R5 designates a conventioal NOR gate having a plurality of input terminals which are connected to the terminals P2, P3, and P4 of a main connovel characteristics of the invention may be incorporated in other structural forms without departing from the spirit and scope of the invention as defined in the following claims.

What is claimed as new and desired to be secured by Letters Patent of the United States is:

1. A numerical feed control device comprising:
   at least one movable member slidably mounted on a machine tool;
   first and second pulse motors for moving said movable member, said first pulse motor having a first resolution and siad second pulse motor having a second resolution different from said first resolution, wherein resolution is defined as the distance of movement of said movable member for each pulse applied to one of said motors;

engaging means for operatively engaging said pulse motors with said movable member; and, a control circuit connected to said pulse motors for controlling the rotation thereof, said control circuit comprising first control means for synchronously rotating both said pulse motors in one direction, second control means for selectively rotating either one of said pulse motors in one direction and stopping the other thereof, and third control means for rotating one of said pulse motors in said one direction and for synchronously rotating the other thereof in the reverse direction, whereby four separate resolutions are obtained by operating said first and second pulse motors individually and by additively and subtractively combining said first and second resolutions by means of said first, second, and third control means.

2. A numerical feed control device as set forth in claim 1, wherein said engaging means comprises a feed screw shaft connected with one of said pulse motors which is mounted on said machine tool;

a nut member rotatably mounted on said movable member and operatively engaged with said feed screw shaft;

a worm mounted on the other pulse motor which is mounted on said movable member; and, a worm wheel concentrically keyed to said nut member and operatively engaged with said wheel, whereby said movable member is moved by means of said pulse motors.

3. A numerical feed control circuit as set forth in claim 1, wherein said control circuit further comprises a reader for reading input information;

a decoder connected to said reader for decoding said input information;

a main control circuit connected between said decoder and said first, second, and third control means; and, a pulse generator connected to said main control circuit and to said pulse motors through said first, second, and third control means, whereby said pulse motors are selectively rotated in response to said input information through said first, second, and third control means.

4. A numerical feed control device as set forth in claim 3, wherein said first, second, and third control means include a plurality of AND gates and OR gates.

5. A numerical feed control device as set forth in claim 4, wherein said first, second, and third means further include a NOR gate.

6. A numerical feed control device as set forth in claim 3, wherein said control circuit still further includes a counter for stopping said pulse generator and resetting said main control circuit upon the reaching of a predetermined count.

* * * * *